United States Patent
McKiernan

[15] 3,650,872
[45] Mar. 21, 1972

[54] METHOD OF MAKING ATHLETIC MATS

[72] Inventor: Eugene McKiernan, Dublin, Ireland
[73] Assignee: Voplex Corporation, Rochester, N.Y.
[22] Filed: Oct. 2, 1969
[21] Appl. No.: 863,241

[52] U.S. Cl. .............................. 156/304, 156/63, 156/216, 156/544
[51] Int. Cl. ........................................................ B29c 19/00
[58] Field of Search............... 156/304, 216, 217, 293, 88, 156/544, 545, 554, 555, 202, 152, 63

[56] References Cited

UNITED STATES PATENTS 2,372,737  4/1945  Kunz...................................156/304
3,301,732  1/1967  Phillips, Jr. ..........................156/545

Primary Examiner—Samuel Feinberg
Assistant Examiner—H. Tudor
Attorney—Cumpston, Shaw and Stephens

[57] ABSTRACT

An athletic mat is made up of uniform plastic foam slabs that are coated with plastic on each face and covered with adhesive along their edges. A mat of the desired shape and color is then assembled by abutting adhesive coated edges of selected slabs to bond together the foam; and the plastic coatings on each face of the bonded slabs are heated, and a heated plastic tape is pressed against the heated coatings to form a fused union between the tape and the coatings on each face of the slabs. The top and bottom coatings along the peripheral edges of the mat are heated, and a heated edge tape is formed into a channel shape and pressed over the peripheral edges and against the heated plastic coatings to form a fused union between the edge tape and the plastic coatings.

14 Claims, 7 Drawing Figures

PATENTED MAR 21 1972 3,650,872

INVENTOR.
EUGENE MC KIERNAN

BY
Cumpston, Shaw + Stephens

ATTORNEYS 3,650,872

METHOD OF MAKING ATHLETIC MATS

THE INVENTIVE IMPROVEMENT:

For years, athletic and wrestling mats have been made of uniform foam slabs coated with plastic. Such mats are often quite large and reach dimensions of 40 feet or more, so that a large number of smaller slabs have to be assembled and coated for a complete mat. The preferred prior art method of accomplishing this was to assemble foam slabs in a work area to form the mat desired, and then spray a plastic coating over the uppermost and peripheral edge surfaces of the slabs. When this coating dried, the mat was turned over and the other side spray-coated.

This method suffered many disadvantages. The coating was difficult and expensive to apply and required much time and skill. Also, the best results were uneven and wasteful of material. Toxic solvents were given off in the process, and proper ventilation was expensive and critical to prevent health, fire and explosion hazards. Also, such coatings were weak, particularly along peripheral edges of the mat where the coating was necessarily thin. The spray coating left relatively sharp and thin edges around the periphery of the mat, and these were quickly cracked and damaged in use.

Athletic mats normally receive extremely rough usage, not only from hard blows and impacts from wrestling and other gymnastic use, but from folding, storing, and movement from place to place. They are often dragged about, scraped over rough surfaces, folded, stored in busy corridors, etc. Finally, users demand that athletic mats maintain a neat and attractive appearance and survive for a relatively long time. Hence, strength, ruggedness, durability and appearance are all very desirable features of athletic mats, yet prior-art attempts at meeting these needs have been only partially successful.

The invention aims at an optimum solution to such needs and proposes a mat-making method that produces a superior mat that is neat in appearance and exceptionally strong and rugged, with a tough, even coating that has no weak regions and is able to withstand extremely rough usage.

SUMMARY OF THE INVENTION:

The inventive method includes forming a plurality of uniform, foamed plastic slabs, covering each face of the slabs with a plastic coating. Adhesive is applied to at least some of the edges of the slabs, and selected slabs for the desired mat are abutted along adhesive-coated edges to bond together the foam plastic bodies. Then the plastic coating of the abutted slabs along each side of the line of abutment is heated, and a plastic seam tape is heated and pressed against the heated coatings along the abutment line to form a fused union between the seam tape and the plastic coatings. This step is repeated on the opposite face of the abutted slabs. The plastic coatings at the top and bottom of the edges of the abutted slabs that lie at the periphery of the mat are heated, and a plastic edge-tape wider than the thickness of the slab is also heated. The edge tape is formed into a channel and pressed against the peripheral edges of the slabs to form a fused union between the heated edge tape and the heated top and bottom plastic coatings along the peripheral edge.

Figure 1:
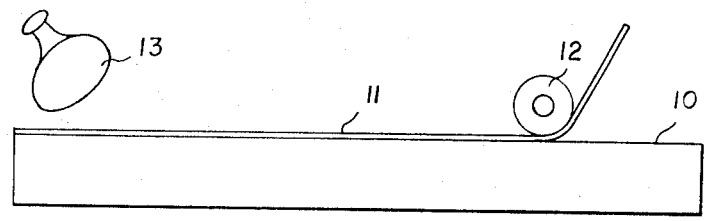
FIG. 1 is a schematic view of the coating of foam slabs for use in making the inventive mat.

DETAILED DESCRIPTION:

Slab 10 for use in the inventive athlete mat-making method is a generally known, foamed-plastic slab preferably of closed-cell, foamed material formed in uniform pieces to provide cushioning. As shown in FIG. 1, slab 10 is coated with plastic, and this is preferably accomplished by covering a face of slab 10 with a plastisol material 11, preferably a polyvinyl chloride plastisol mix such as generally known and commercially available. Plastisol 11 contains nonvolatile plasticizers and is formed into a solid plastic coating by heat. Alternatively, a plastic coating can be formed by an application including volatile solvents.

It is preferred for uniformity that plastisol 11 be applied to slab 10 by roll-coater 12 and heated by radiant heat element 13. The heating of plastisol coating 11 is preferably confined substantially to coating 11 to prevent softening the foamed plastic material of slab 10. Radiant heater 13 is preferred for this, but contact heating with a hot roll is also workable. Also, plastisol 11 can be sprayed or applied to slab 10 by means other than roll-coater 12.

The process shown in FIG. 1 is repeated for the opposite face of slab 10 so that both faces of slab 10 are covered with a solid plastic coating formed by plastisol material 11. Preferably the same material 11 is used for coating each face of slab 10. Adhesive is then applied preferably to all the edges of slabs 10 for later joining slabs 10 together. Slabs 10 can then be made in uniform sizes in any desired colors for convenient assembly into larger mats as desired.

Figure 2:
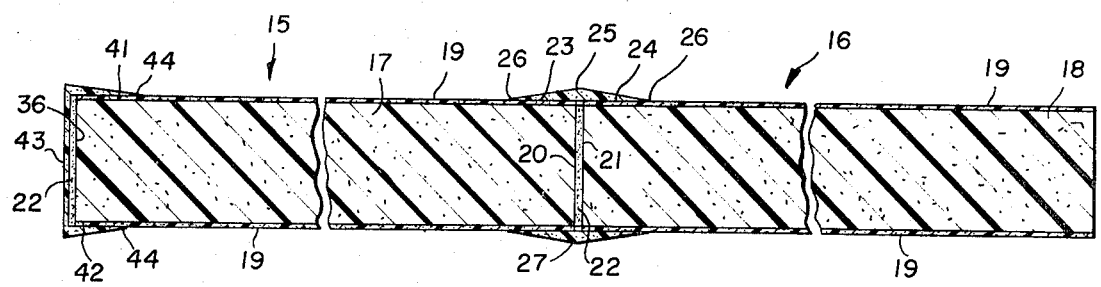
FIG. 2 is a partially schematic, cross-sectional view of mat slabs joined according to the invention.

As best shown in FIG. 2, selected slabs 15 and 16 having foamed plastic bodies 17 and 18 coated on their tops and bottoms with plastic coatings 19 formed from plastisol material 11 are butted together along respective edges 20 and 21. Adhesive 22 applied to edges 20 and 21 bonds foam bodies 17 and 18 together along the abutment line. This leaves a tiny open seam between plastic coatings 19 at the tops and bottoms of slabs 15 and 16.

The areas 23 and 24 of plastic coatings 19 adjacent the abutment line are heated, and a plastic seam tape 25 is heated and pressed against areas 23 and 24 to form a fused union with plastic coating 19 throughout areas 23 and 24 to bridge the abutment line and form a strong, fused seam. Tape 25 is preferably extruded of the same plastisol material 11 used to form coatings 19 so that it is compatible with coatings 19 and fuses integrally with coatings 19 at a common fusion temperature. Also, as exaggerated in FIG. 2, tape 25 is preferably thicker in the center and formed with feathered edges 26 to merge neatly with coatings 19. Feather-edges 26 form a smooth, and practically invisible seam line to protect the mat users and inhibit any loosening of tape 25 along its edges. Also, tape 25 bridges and evens any irregularity in thickness between adjacent slabs to form an even, smooth seam.

After seam tape 25 is applied, slabs 15 and 16 are preferably turned over, and another seam tape 27 is fused to coatings 19 on the opposite face of slabs 15 and 16 in the same way. Seams are taped on each surface of mat slabs in various order as most convenient for assembling the desired mat.

Figure 4:
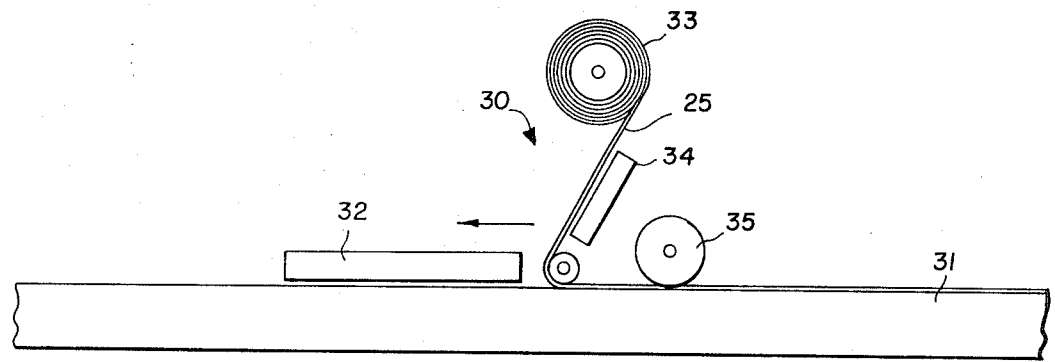
FIG. 4 is a partially schematic, elevational view of a seam-taping tool for use in the inventive method.

FIG. 4 schematically shows a seam taping tool 30 preferred for applying seam tapes 25 and 27. Tool 30 moves along a seam line over a pair of abutted slabs 31 in the direction of the arrow so that a heated platen 32 heats the plastic coating on each side of the seam line. Tape 25 is fed from a supply reel 33 past heater 34 and over the surface of slabs 31 where it is pressed in place by heated roller 35 to form a fused union with the plastic coating on slabs 31.

Figure 3:
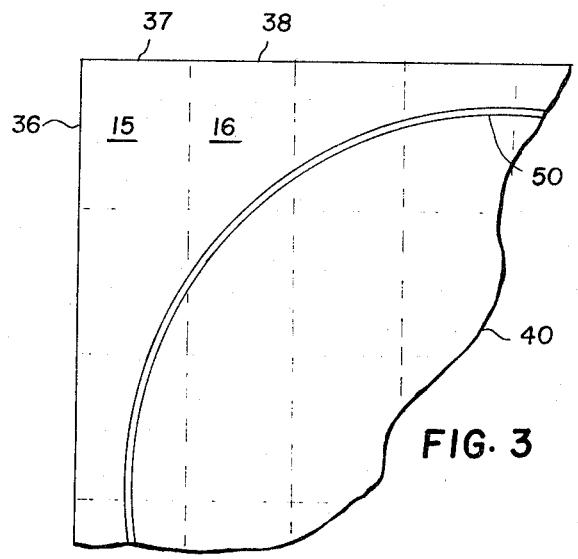
FIG. 3 is a partially schematic fragment of the inventive mat.

As slabs 15, 16 and other slabs are assembled to form a finished mat, some of the edges of the slabs lie along the periphery of the mat. For example, as shown in FIG. 3, edges 36, 37 and 38 of slabs 15 and 16 lie at the periphery of mat 40. These edges are covered with an edge tape 43 as best shown in FIG. 2. Edge regions 41 and 42 of the plastic coatings 19 of slab 15 adjacent peripheral edge 36 are heated to soften coatings 19 for fusion. An edge tape 43 wider than the thickness of slabs 15 and 16 is also heated and formed into the illustrated channel shape as it is pressed against heated regions 41 and 42 to form a fused union between tape 43 and the top and bottom peripheral edges of plastic coatings 19. Preferably, edge 36 is also coated with adhesive 22 to form a bond between foam body 17 and edge tape 43. Also, the edges 44 of edge tape 43 are preferably feathered for a smooth junction with coatings 19 in a manner similar to feathered edges 26 of seam tape 25. Edge tape 43 preferably extends along the peripheral edges of several abutted slabs to strengthen mat 40.

Figure 5:
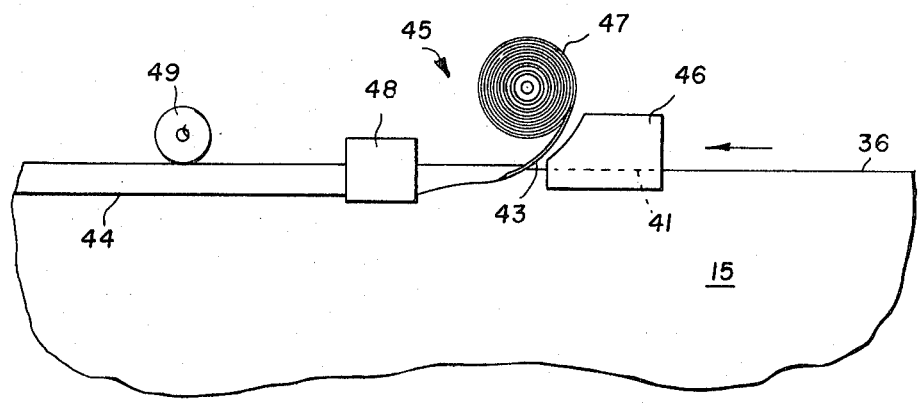
FIG. 5 is a partially schematic, plan view of edge-taping equipment for use in the inventive method.

Edge tape 43 is preferably extruded of the same plastisol material 11 that forms coatings 19, and is preferably made relatively thick at the corner edges of its channel shape. Edge tape 43 is preferably applied as schematically shown in FIG. 5 by moving slab 15 through edge taper 45 in the direction of the arrow. A heater 46 is arranged for heating region 41 of slab 15 and for heating edge tape 43 as it unwinds from supply reel 47. Heater 46 preferably extends around edge 36 to heat region 42 on the opposite face of slab 15 at the same time that region 41 is heated. Rollers 48 arranged above and below slab 15 form tape 43 into its channel shape and press tape 43 against regions 41 and 42 to form the fused or welded union of tape 43 with the plastic coating of slab 15. Roller 49 is preferably arranged to press tape 43 against the face of edge 36 for bonding tape 43 to adhesive coating 22.

Seam taper 30 can also be used to fuse a marking tape 50 to mat 40 as best shown in FIG. 3. Marking lines are desired on wrestling mats for various uses and purposes, and are preferably formed by fusing a marking tape 50 to the plastic coating on the surface of assembled mat 40. This is preferably accomplished by heating the plastic coating and marking tape 50 and pressing them together in the same way that seam tapes 25 and 27 are applied. Marking tape 50 is also preferably feather-edged for a smooth union with the mat.

Figure 6:
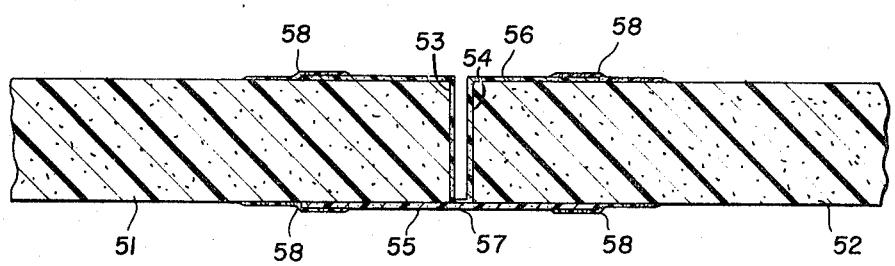
FIG. 6 is a fragmentary, cross-sectional view of a hinge construction for the inventive mat-making method.
Figure 7:
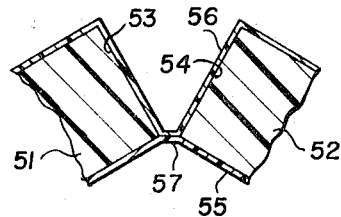
FIG. 7 shows the hinge movement of the hinge construction of FIG. 6.

FIGS. 6 and 7 show preferred hinge construction for mats. Mat portions 51 and 52 are preferably finished as described above with fully coated tops and bottoms and taped seams and edges as previously described. Edges 53 and 54, are then arranged in confronting relation, as illustrated, to form a hinge line. A hinge strip 55, preferably formed of a woven fabric made of a strong and durable material such as nylon is preferably coated with plastic material such as plastisol 11 and secured to corresponding faces of mat portions 51 and 52, as illustrated, to bridge the hinge line between confronting edges 53 and 54. Another fabric strip 56 is secured to the opposite faces of mat portions 51 and 52 and to confronting edges 53 and 54 and is stitched to fabric strip 55 along line 57. Strips 55 and 56 can be secured to mat portions 51 and 52 by fusion or adhesive, and adhesive is preferred. Also, strips 55 and 56 can be stitched together along line 57 before or after fastening to mat portions 51 and 52.

Mat portions 51 and 52 then have hinged motion relative to each other along line 57 as best shown in FIG. 7, and the entire edges of mat portions 51 and 52 are well protected and securely joined together by strips 55 and 56. The material along hinge line 57 is double thickness and strength, and the illustrated arrangement of strips 55 and 56 ensures that the hinge does not pull apart in use.

To complete the hinge construction, tapes 58 are preferably fused to fabric strips 55 and 56 and the plastic coatings on mat portions 51 and 52 adjacent strips 55 and 56 as illustrated, to form smooth unions protecting the edges of strips 55 and 56. Tapes 58 are preferably formed of the same plastisol material 11 used in coating and taping mat portions 51 and 52, and are preferably feather-edged for the same reasons explained above. Hinge line 57 is preferably disposed at opposite faces of the finished mat for multiple hinged mats.

The inventive mat construction method allows more economical mat construction, simpler methods, and produces a strong, rugged and neat mat fulfilling the objects of the invention. Persons wishing to practice the invention should remember that other embodiments and variations can be adapted to particular circumstances. Even though one point of view is necessarily chosen in describing and defining the invention, this should not inhibit broader or related embodiments going beyond the semantic orientation of this application but falling within the spirit of the invention. For example, various sizes and shapes of slabs can be used with a variety of foam, coating, and tape materials. Those skilled in the art will readily understand the adaptation of the inventive method to various specific mat constructions.

I claim:

1. A method of making an athletic mat, said method comprising:
   a. forming a plurality of uniform, foamed, plastic slabs;
   b. covering each face of each of said slabs with a plastic coating;
   c. applying an adhesive to at least some of the edges of said slabs;
   d. butting adhesive-coated edges of selected ones of said slabs together to bond together said foamed plastic of said abutted slabs;
   e. heating said plastic coating of said abutted slabs along each side of the line of said abutment;
   f. heating a plastic seam tape, and pressing said heated seam tape against said heated plastic coatings along said abutment line to form a fused union between said seam tape and said plastic coatings on each side of said abutted slabs;
   g. heating said plastic coatings of said abutted slabs along each side of said abutment line on the face of said slabs opposite said seam tape;
   h. heating another plastic seam tape, and pressing said heated seam tape against said heated plastic coatings along said abutment line to form a fused union between said seam tape and said plastic coatings on each side of said abutted slabs;
   i. heating said plastic coatings at the top and bottom of the edges of said abutted slabs lying at the periphery of said mat; and
   j. heating a plastic edge tape wider than the thickness of said slabs, and pressing said heated edge tape over said peripheral edge and against said heated top and bottom plastic coatings at said peripheral edge to form a fused union between said edge tape and said top and bottom plastic coatings along said peripheral edge.

2. The method of claim 1 wherein said coating is plastisol, and said plastisol is heated to form a solid, plastic coating on said slab without substantially softening said foamed plastic.

3. The method of claim 2 wherein said seam and edge tapes are feather-edged.

4. The method of claim 2 including using radiant heat for heating said plastisol.

5. The method of claim 1 wherein said seam and edge tapes are feather-edged.

6. The method of claim 1 wherein said adhesive is applied to all edges of said slabs to form an adhesive bond between said foamed plastic and said edge tape.

7. The method of claim 1 including heating said plastic coating of said mat along a line to be marked on said mat, heating a plastic marking tape, and pressing said heated marking tape against said plastic coating along said mark line to form a fused union between said marking tape and said plastic coating.

8. The method of claim 1 including confronting a pair of edge-taped portions of said mat along a hinge line, and securing a fabric hinge strip across said hinge line of said mat portions.

9. The method of claim 8, including coating said fabric hinge strips with plastic before said adhesion to said mat portions.

10. The method of claim 1 wherein said seam tape is pressed in place by a heated roller on a portable tool that includes a heated platen for heating said plastic coatings for fusion to said seam tape.

11. The method of claim 1 wherein said edge tape is applied by feeding said abutting slabs through a machine that heats said plastic coatings along said peripheral edge, heats said edge tape, and presses said edge tape against said heated plastic coatings along said peripheral edge.

12. The method of claim 11 wherein said coating is plastisol, and said plastisol is heated to form a solid, plastic coating on said slab without substantially softening said foamed plastic.

13. The method of claim 12 wherein said seam and edge tapes are feather-edged and formed of said plastisol.

14. The method of claim 2 wherein said seam and edge tapes are plastisol.

* * * * *